United States Patent
Hwang et al.

(10) Patent No.: US 6,400,046 B1
(45) Date of Patent: Jun. 4, 2002

(54) LINEAR MOTOR DRIVER HAVING A POSITION DETECTION MEANS

(75) Inventors: Ji Hyun Hwang; Do Hyun Kim, both of Kyungki-do; Jang Sung Chun, Seoul, all of (KR)

(73) Assignee: Mirae Corporation, Choongchungnam-do (KR)

( * ) Notice: Subject to any disclaimer, the term of this patent is extended or adjusted under 35 U.S.C. 154(b) by 0 days.

(21) Appl. No.: 09/579,265

(22) Filed: May 26, 2000

(30) Foreign Application Priority Data

May 27, 1999 (KR) ............................................. 99-19298
Sep. 15, 1999 (KR) ............................................. 99-39592

(51) Int. Cl.[7] ............................................. H02K 41/00
(52) U.S. Cl. ....................................................... 310/12
(58) Field of Search ............................... 310/12, 13, 14

(56) References Cited

U.S. PATENT DOCUMENTS

| | | | | |
|---|---|---|---|---|
| 4,595,870 A | | 6/1986 | Chitayat | 318/687 |
| 5,977,664 A | * | 11/1999 | Chitayat | 310/12 |
| 6,008,552 A | * | 12/1999 | Yagoto et al. | 310/12 |
| 6,259,220 B1 | * | 7/2001 | Hays et al. | 318/481 |

* cited by examiner

Primary Examiner—Nestor Ramirez
Assistant Examiner—Judson H. Jones
(74) Attorney, Agent, or Firm—Fleshner & Kim, LLP (57) ABSTRACT

There is disclosed a linear motor driver for a permanent magnet movable type linear motor employing a stator and a movable element, the driver performing the partial excitation of the movable element. The driver includes a stator having coil block and disposed on an inner bottom surface of a U-shaped frame, a movable element having a plurality of permanent magnets at an armature frame, a shield member provided on one side surface of the movable element, and having a magnet sensing unit formed on one side surface thereof for blocking magnet fields generated from the plurality of permanent magnets, and a controller board disposed on an inner wall of the U-shaped frame, and for sensing magnet fields generated from the magnet sensing unit to selectively supply an electric current into the coil block. Thus, an erroneous recognition of the position of the movable element can be prevented which may occur due to the magnet fields generated from the permanent magnets used for creating a thrust force of the motor. Therefore, an optimum driving condition for the linear motor can be accomplished. Further, by partly exciting the coils to drive the movable element, the power consumption by the coils can be reduced, and heat generated when the current flows into the coils can be minimized.

18 Claims, 6 Drawing Sheets

FIG. 1

BACKGROUND ART

FIG. 2

BACKGROUND ART

LINEAR MOTOR DRIVER HAVING A POSITION DETECTION MEANS

BACKGROUND OF THE INVENTION

1. Field of the Invention

The present invention relates to a linear motor driver, and more particularly to a linear motor driver for driving a permanent magnet movable type linear motor by partly exciting a movable element employed therein.

2. Description of the Conventional Art

Generally speaking, a linear motor employs a stator containing coil block and a movable element containing permanent magnets. The coil block and the permanent magnets are installed parallel to each other in a horizontal direction, respectively, so that the coil block faces the permanent magnets.

The supply of an electric current into the coil block of the stator generates a thrust force between the coil block and the permanent magnets under Fleming's left-hand rule. The generated thrust force permits direct linear motion of the movable element along the longitudinal direction of the stator.

Figure 1:
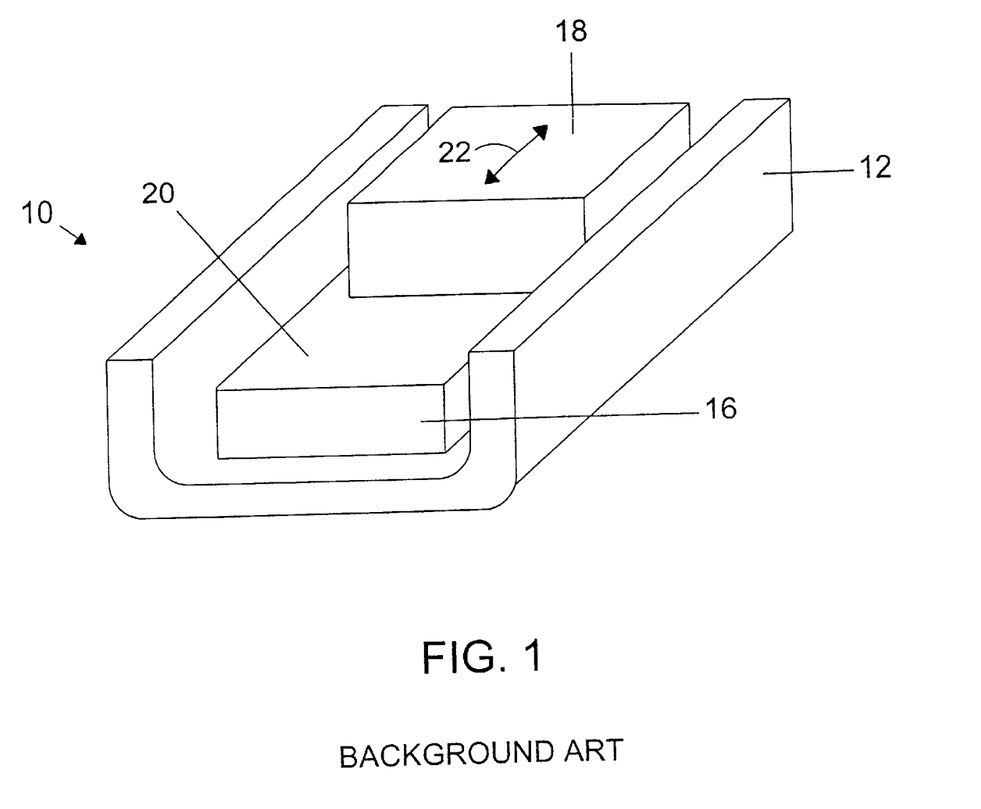
FIG. 1 is a perspective view of a linear motor according to the prior art.
Figure 2:
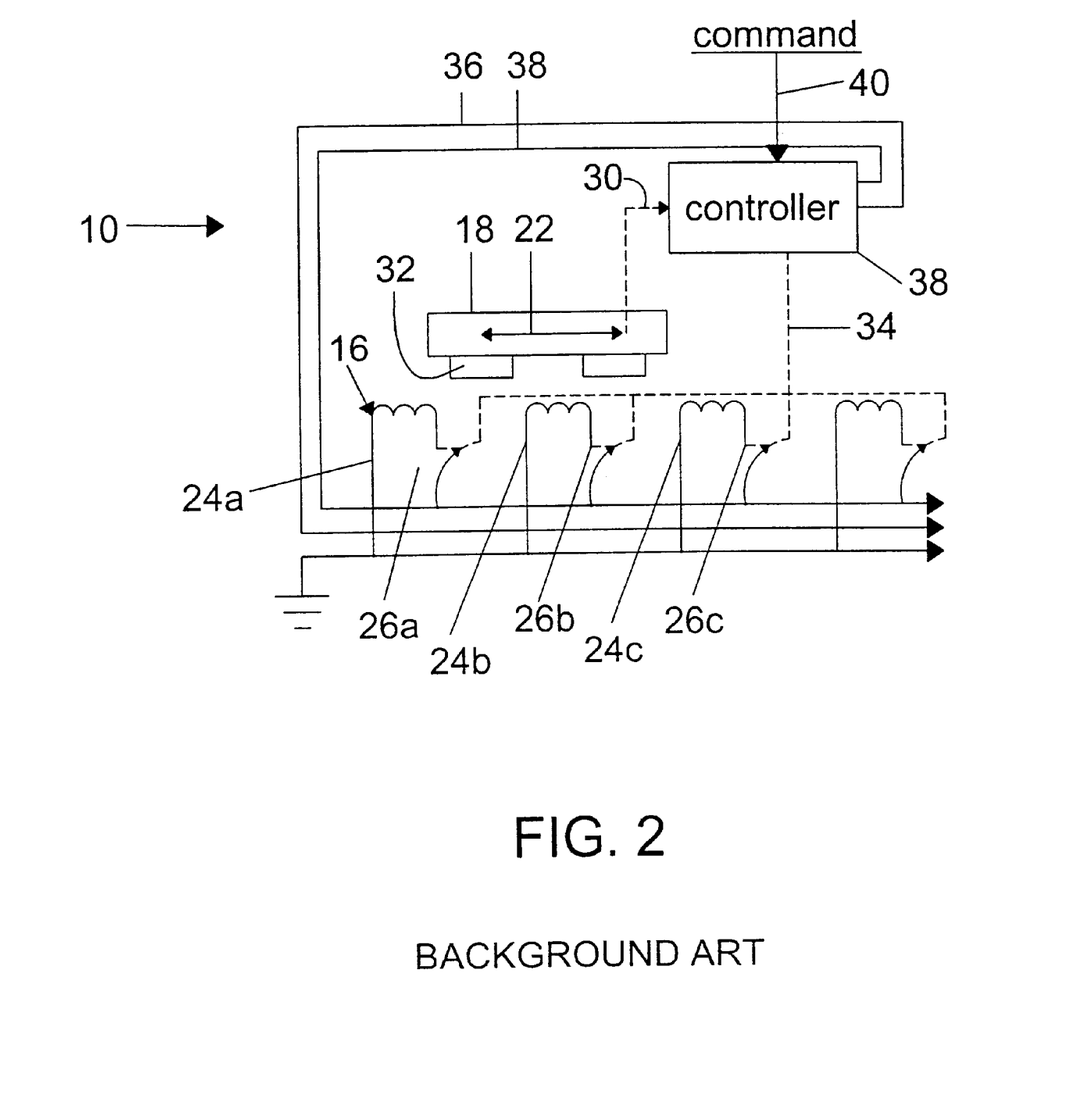
FIG. 2 is a control system for the linear motor shown in FIG. 1.

A conventional linear motor made it possible such a direct linear movement is disclosed in U.S. Pat. No. 4,595,870, which will be described below. FIGS. 1 and 2 used in the referenced patent application are also here shown, in which FIG. 1 is a perspective view of a linear motor according to the prior art, and FIG. 2 is a control system for the linear motor shown in FIG. 1.

FIG. 1 shows a configuration of the conventional typical linear motor 10. The linear motor shown in FIG. 1 includes a U-shaped channel 12 and a movable element 18. The U-shaped channel 12 mounted on a mounting surface (not shown) encloses a wound stator 16. On an upper surface of wound stator 16, the movable element 18 is disposed to be moved in a direction indicated by a double-headed arrow 22.

Movable element 18 includes a plurality of permanent magnets (not shown) facing upper surface 20 of wound stator 16 for producing a magnetic field for interaction with the magnetic field produced by the coil block (not shown) of wound stator.

Referring to FIG. 2, a control system is employed which controls generation of magnetic fields between the stator 16 containing coil block and the movable element 18 containing a plurality of permanent magnets, and further controls a thrust force created due to interaction between the magnetic fields produced.

Control system 28 receives commands from a host (not shown). Upon receipt of commands, control system 28 receives through information channel 30 positional information representing positional relationship between the permanent magnets 32 of movable element 18 and respective coils 24a, 24b, 24c of the stator 16, and in response thereto, the control system 28 selectively controls the switches 26a, 26b, 26c to control an application of power supply into each of coils 24a, 24b, 24c.

On the other hand, the above-described control system, which is used to selectively control said switches 26a, 26b, 26c, receives information through the information channel 30 when the movable element 18 leaves the coil 24a, and in response thereto, opens the switch 26a connected the coil 24a to block the supply of the power supply. Namely, the control system 28 serves to partly excite the respective coils 24a, 24b, 24c based upon the movement of the movable element 18.

The above-described prior art uses a magnetic sensor and a Hall-effect device (not shown) in order to partly excite the respective coils 24a, 24b, 24c provided to the stator 16. In the case of the use of such a magnetic sensor and the Hall-effect device, the magnetic fields from the permanent magnets in the movable element causes an erroneous operation of the Hall-effect device, which results in malfunction of the linear motor.

SUMMARY OF THE INVENTION

Therefore, an object of the present invention is to provide a driver for a linear motor which senses position of movable element to partly excite coils provided to a stator, with the influence of magnetic fields from permanent magnets directly associated with thrust force of the linear motor being minimized.

Further, another object of the present invention is to reduce power consumption by partly exciting respective coils of the stator and to minimize heat generation by selectively exciting respective coils.

To accomplish the above-mentioned objects, this invention provides a driver for a linear motor, the driver comprising: a stator having coil block and disposed on an inner bottom surface of a U-shaped frame; a movable element having a plurality of permanent magnets at an armature frame; a shield member provided on one side surface of the movable element, and having a magnet sensing unit formed on one side surface thereof for blocking magnet fields generated from the plurality of permanent magnets; and a controller board disposed on an inner wall of the U-shaped frame, and for sensing magnet fields generated from the magnet sensing unit to selectively supply an electric current into the coil block.

Thus, an erroneous recognition of the position of the movable element can be prevented which may occur due to the magnet fields generated from the permanent magnets used for creating a thrust force of the motor. Therefore, an optimum driving condition for the linear motor can be accomplished. Further, by partly exciting the coils to drive the movable element, the power consumption by the coils can be reduced, and heat generated when the current flows into the coils can be minimized.

DETAILED DESCRIPTION OF THE INVENTION

The details of the preferred embodiment in accordance with the present invention will be described below, with reference to the accompanying drawings.

Figure 3:
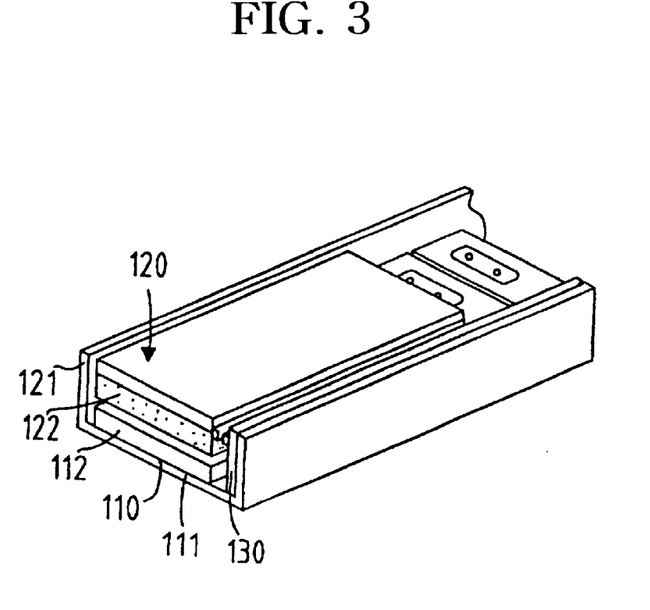
FIG. 3 is a perspective view of a linear motor according to the present invention.
Figure 4:
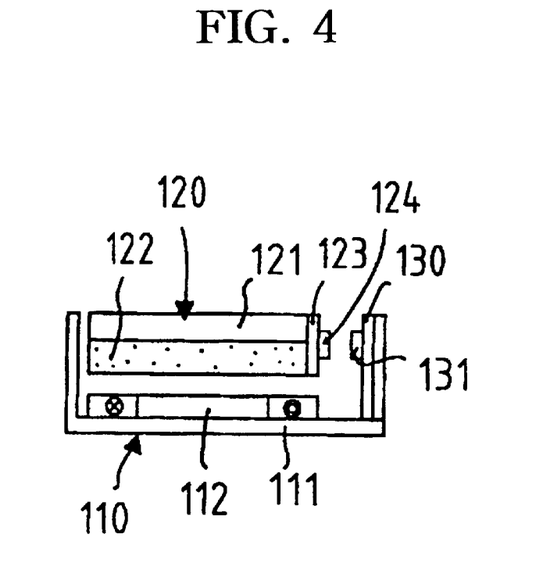
FIG. 4 is a plan view of the linear motor shown in FIG. 3.
Figure 5:
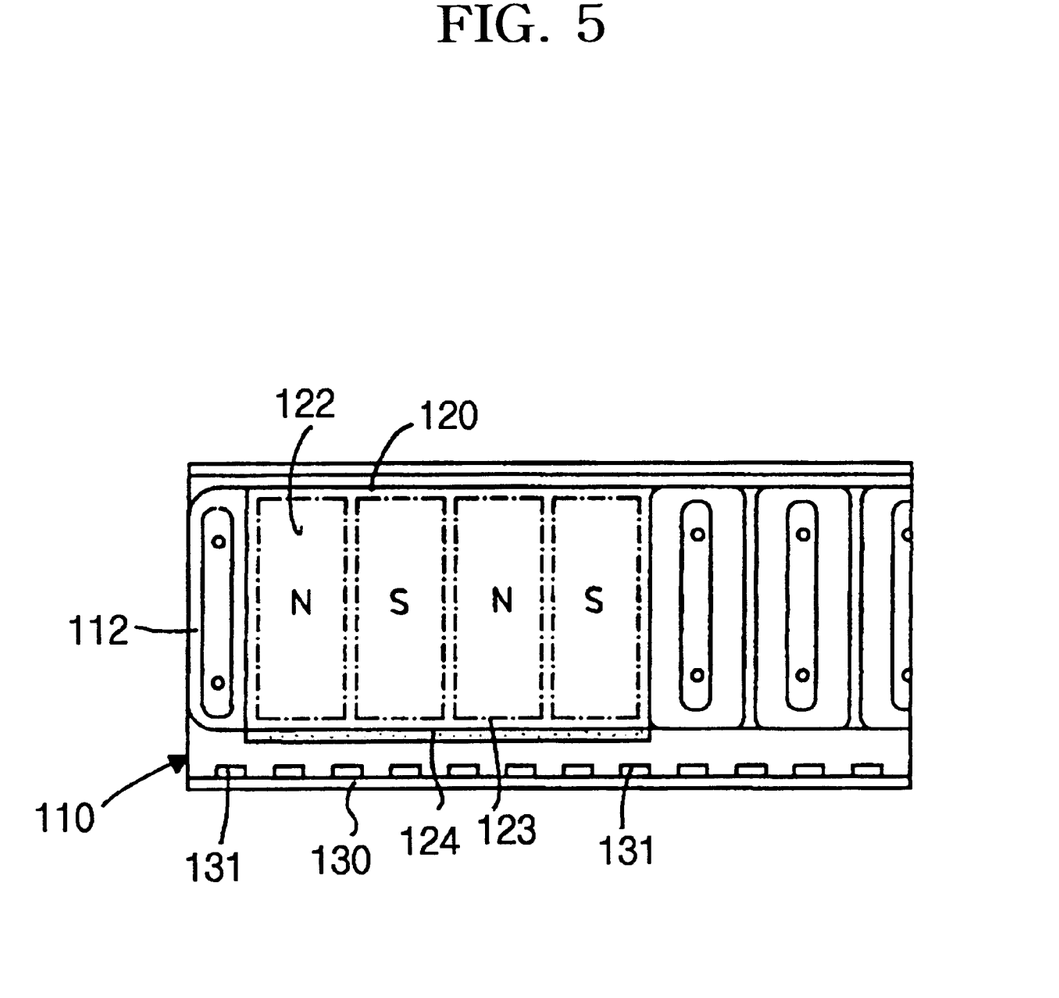
FIG. 5 is a sectional view of the linear motor shown in FIG. 3.
Figure 6:
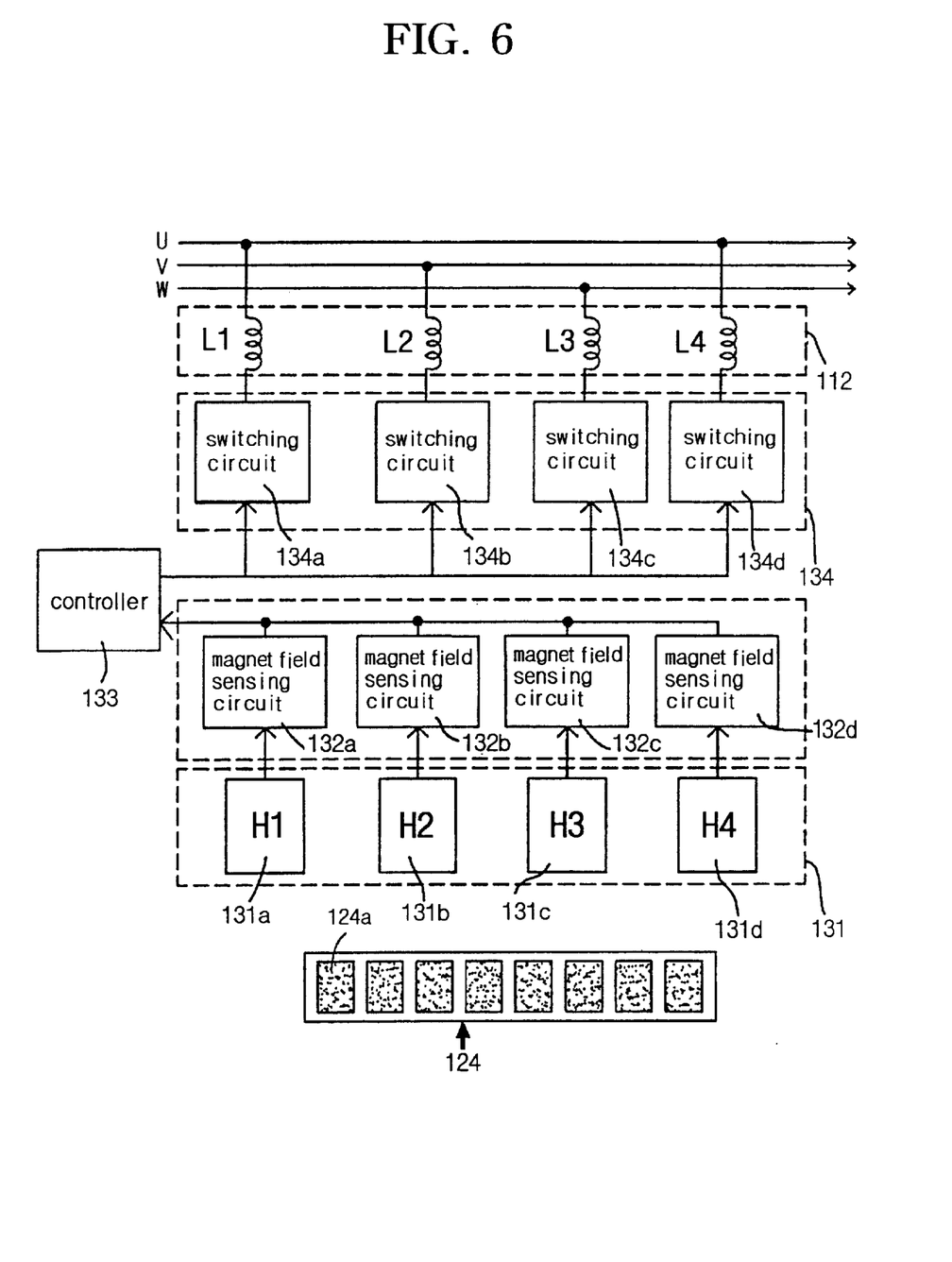
FIG. 6 is a circuit diagram of a controller for the linear motor in accordance with the present invention.
Figure 7:
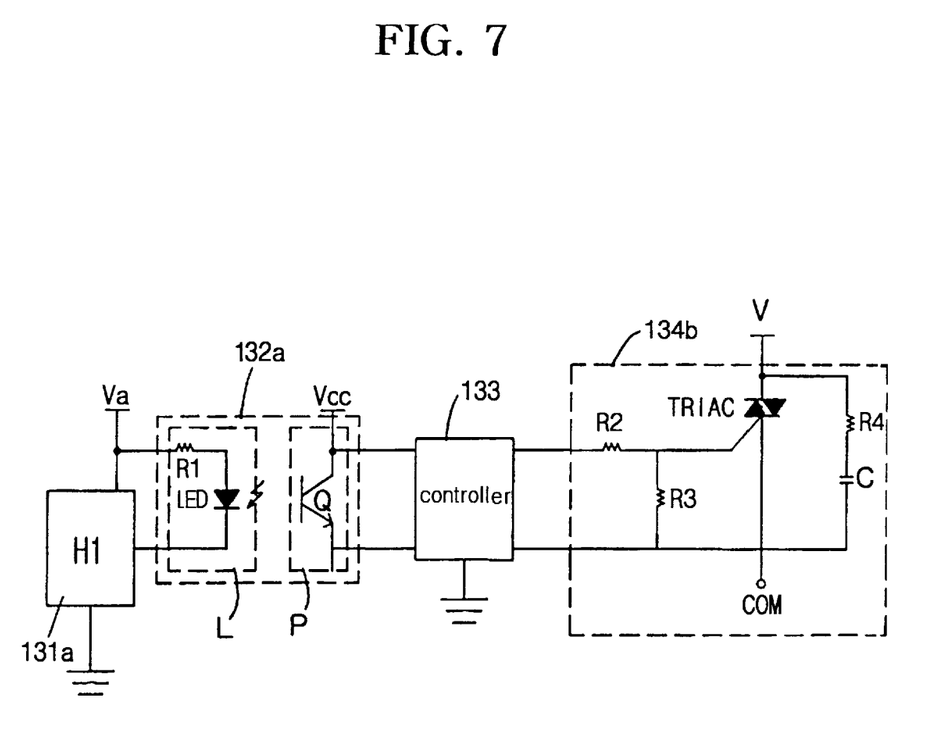
FIG. 7 is a circuit diagram concretely showing a driving unit of the linear motor shown in FIG. 6.

In the accompanying drawings, FIG. 3 is a perspective view of a linear motor according to the present invention, FIG. 4 is a plan view of the linear motor shown in FIG. 3, FIG. 5 is a sectional view of the linear motor shown in FIG. 3, FIG. 6 is a circuit diagram of a controller for the linear motor in accordance with the present invention, and FIG. 7 is a circuit diagram concretely showing a driving unit of the linear motor shown in FIG. 6.

A driver for a linear motor according to the present invention comprises: a stator having coil block and disposed on an inner bottom surface of a U-shaped frame; a movable element having a plurality of permanent magnets at an armature frame; a shield member provided on one side surface of the movable element, and having a magnet sensing unit formed on one side surface thereof for blocking magnet fields generated from the plurality of permanent magnets; and a controller board disposed on an inner wall of the U-shaped frame, and for sensing magnet fields generated from the magnet sensing unit to selectively supply an electric current into the coil block.

The detailed construction of the present invention will be described below.

The linear motor employs a stator 110 and a movable element 120, the stator containing coil block 112 mounted at an inner bottom surface of a U-shaped frame 111.

The coil block 112 is disposed along a longitudinal direction of the U-shaped frame 111. The movable element 120 is disposed above an upper surface of the coil block 112, with a constant spacing between the movable element 120 and the upper surface of the coil block 112 maintained. The movable element 120 contains permanent magnets 122 at a bottom surface of an armature frame 121.

Further, a plurality of permanent magnets 122 each having the N and S magnetic poles are arranged with a constant spacing between said magnets. The movable element 120 containing a plurality of permanent magnets 122 and having a shorter length than that of the stator 110 is guided and moved to both side surfaces of the stator 110. The movable element 120, which is guided and moved to the stator 110, is provided with a magnet sensing unit 124 used to sense the position of the movable element 120.

In this case, as shown in FIG. 4, the magnet sensing unit 124 is mounted on a shield member 123 disposed on one side surface of the movable element 120. The shield member 123 functions to prevent a Hall-effect unit 131 or the magnet sensing unit 124 from being affected by magnetic fields generated from the plurality of permanent magnets 122, the Hall-effect unit being installed at a controller board 130. The use of the shield member 123 makes sure to perform a stable operation of the Hall-effect unit or the magnet sensing unit 124 for sensing the position of the movable element 120.

At the controller board 130 is disposed the Hall-effect unit for sensing magnet fields generated from the magnet sensing unit 124 installed at one side surface of the movable element 120. The controller board 130 is installed upright inside the U-shaped frame 111 of the stator 110. The upright installed controller board is provided with the Hall-effect devices which are spaced apart by a constant distance to each other, as shown in FIG. 5.

Thus, the Hall-effect devices are positioned at the same level as the magnet sensing unit 124 so that magnet fields generated from the magnet sensing unit 124 can be sensed.

When the Hall-effect unit 131 senses the magnet fields, the Hall-effect unit 131 generates a constant voltage corresponding to the sensed magnet fields. Upon receipt of the constant voltage output, the controller board 130 performs the controlling of the selective supply of the current into the coil block 112. Namely, the controller board 130 senses the position of the movable element 120, determines the movement direction for the movable element 120, and then partly excites the coil block 112 located at a place where the movable element is to be positioned.

The partly exciting of the coil block 112 through the use of the controller board will be described, with reference to FIG. 6. As shown in FIG. 6, the controller board 130 includes the Hall-effect unit 131, a magnet field sensing circuit unit 132, a controller 133 and a switching circuit unit 134.

Also, the Hall-effect unit 131 senses the magnet fields generated from the magnet sensing unit 124 installed at side surface of the movable element 120. When the Hall-effect unit 131 senses the magnet fields, the Hall-effect unit 131 generates a constant voltage corresponding to the sensed magnet fields. The magnet field sensing circuit unit 132 is activated when receiving the constant voltage output. The magnet field sensing circuit unit 132 thus activated comprises a plurality of magnet sensing circuits 132a to 132d. This is because the number of Hall-effect devices are determined depending upon the length of the movable element 120.

In this case, the provision of the plural Hall-effect devices 131 to 131d, the number of devices being proportional to the length of the stator 110, guarantees to sense the magnet fields generated from the magnet sensing unit 124 according to the movement of the movable element 120. The number of the Hall-effect devices 131a to 131d is determined depending upon the length of the stator 110, and a plurality of magnet field sensing circuits 132a to 132d are provided accordingly.

The magnet field sensing circuit unit 132, which is activated by the constant voltage output from the Hall-effect unit 131, outputs a constant level of the voltage which is in turn applied to the controller 133. The controller 133 counts the constant voltage received thereto to determine the position of the movable element 120 resulting from the movement of the movable element 120. The controller that has recognized the position of the movable element 120 generates and outputs a control signal for partly exciting the coil block 112 based upon the moving direction of the movable element 120.

The control signal output from the controller 133 is applied to the switching circuit unit 134. Alternating current components U, V, W being supplied to the coil block 112 are switched by the switching circuit unit 134 in response to the control signal. The switching circuit unit 134 for performing the switching responsive to the received control signal consists of a plurality of switching circuits 134a to 134d. The number of switching circuits is determined proportional to the length of the stator 110 as with the magnet field sensing circuit unit 132.

For the switching circuit unit 134 consisting of the plurality of switching circuits 134a to 134d, any of the switching circuits may be selected based upon the control signal received. In case the switching circuit 134a is selected, the switching circuit 134a selected is switched so that alternating current component U can conduct a coil L1. Similarly, the remaining switching circuits 134b to 134d are also switched so that the alternating current components U, V, W can conduct the coils L2 to L4. By thus selecting the coils L1 to L4 according to the control signal, the coils can be selectively excited based upon the position of the movable element 120.

Next, referring to FIG. 7, the magnet field sensing circuit 132a and the switching circuit 132b will be explained which are used to partly excite the coils L1 to L4. As shown in FIG. 7, the magnet field sensing circuit 132a consists of a light emission element L and a light receiving element P. The light emission diode LED may be used as the light emission element L. The photo-transistor Q may be used as the light receiving element P.

A direct voltage Vcc is applied to one terminal of the LED through a load resistor R1, and the other terminal of the same LED is coupled to the Hall-effect device 131a. When the Hall-effect device 131a senses the magnet field generated from the magnet sensing unit 124, the LED generates a photo signal which the photo-transistor Q receives. Responsive to the photo signal received, the photo-transistor Q is activated to output a constant voltage.

Then, the constant voltage output from the phototransistor Q is provided to the controller 133. In the controller 133, the constant voltage received is converted into a digital signal corresponding thereto. By counting the digital signal, the position of the movable element 120 can be determined. When the determining of the position of the movable element 120 is made, the controller generates control signal for partly exciting the plurality of coils L1 to L3 according to the moving direction of the movable element 120.

The control signal thus generated is provided to the switching circuit 134b. That is, when the current position of the movable element 120 matches that of the Hall-effect device 131a, the controller 133 generates control signal for exciting the next coil L2. Then, the switching circuit 134b receives the control signal whose potential is divided by resistors R2 and R3 to be applied to a triac element TRIAC.

The triac element TRIAC is turned on in response to the control signal, thereby conducting the alternating current component U through the coil L2 to a common terminal COM. Such an operation is repeated. By repetition, the controller 133 can partly excite an adjacent coil to which the movable element 120 will be moved.

According to the present invention, the magnet sensing unit and the Hall-effect unit can be protected from the influence of the plurality of permanent magnets contained in the movable element. Further, by partly exciting the coils, a minimum generation of heat and a reduced power consumption can be achieved.

According to the foregoing, an erroneous recognition of the position of the movable element can be prevented which may occur due to the magnet fields generated from the permanent magnets used for creating a thrust force of the motor. Thus, an optimum driving condition for the linear motor can be accomplished. Further, by partly exciting the coils to drive the movable element, the power consumption by the coils can be reduced, and heat generated when the current flows into the coils can be minimized.

What is claimed is:

1. A linear motor, comprising:
   a U-shaped frame;
   a plurality of coils disposed on an inner bottom surface of the U-shaped frame;
   a movable member that is movably mounted in the U-shaped frame over the plurality of coils;
   a plurality of drive magnets mounted on the movable member so that the plurality of drive magnets oppose the plurality of coils;
   a plurality of position magnets mounted on a side surface of the movable member;
   a shield member mounted on the movable member and interposed between the drive magnets and the position magnets; and
   a plurality of position sensors mounted on an inner side of the U-shaped frame such that the position sensors are opposed to the position magnets, wherein the position sensors are configured to sense magnetic fields of the plurality of position magnets as the position magnets move past the position sensors.

2. The linear motor of claim 1, further comprising:
   a position sensing circuit coupled to the plurality of position sensors and configured to output position signals indicative of the position of the movable member;
   a controller coupled to the position sensing circuit and configured to receive the position signals and to output control signals; and
   a switching circuit coupled to the controller and configured to receive the control signals and to selectively apply movement signals to the plurality of coils to control movement of the movable member based on the control signals.

3. The linear motor of claim 2, wherein each position sensor is configured to output a proximity signal when one of the position magnets moves past the position sensor, wherein the position sensing circuit comprises a plurality of magnetic field sensing circuits, each of which is coupled to one of the plurality of position sensors and to the controller, and wherein each magnetic field sensing circuit comprises:
   a light emission element coupled to one of the position sensors and configured to generate a photo-signal upon receiving a proximity signal from the position sensor; and
   a light receiving element configured to output one of the position signals upon receiving the photo-signal from the light emission element.

4. The linear motor of claim 3, wherein the light emission element comprises a light emitting diode.

5. The linear motor of claim 3, wherein the light receiving element comprises a photo-transistor.

6. The linear motor of claim 3, wherein the plurality of position sensors comprise a plurality of Hall-effect sensors.

7. The linear motor of claim 3, wherein the switching circuit comprises a plurality of triac elements, each of which is coupled to the controller and to one of the plurality of coils, and wherein each triac element selectively applies alternating current components to a coil in response to the control signals generated by the controller.

8. The linear motor of claim 1, further comprising a position sensing circuit coupled to the plurality of position sensors and configured to output position signals indicative of the position of the movable member, wherein the position sensing circuit comprises a plurality of magnetic field sensing circuits, each of which is coupled to one of the plurality of position sensors, and wherein each magnetic field sensing circuit comprises:
   a light emission element coupled to one of the position sensors and configured to generate a photo-signal upon receiving a signal from the position sensor; and
   a light receiving element configured to output one of the position signals upon receiving a photo-signal from the light emission element.

9. The linear motor of claim 8, wherein the light receiving element comprises a photo-transistor.

10. The linear motor of claim 8, wherein the plurality of position sensors comprise a plurality of Hall-effect sensors.

11. The linear motor of claim 1, wherein the shield member prevents at least a portion of magnetic fields generated by the drive magnets from affecting the position sensors.

12. A linear motor, comprising:

a support frame;

a plurality of coils disposed along the support frame;

a movable member that is movably mounted on the support frame;

a plurality of drive magnets mounted on the movable member so that the plurality of drive magnets oppose the plurality of coils;

a plurality of position magnets mounted on the movable member;

a plurality of position sensors mounted on the support frame such that the position sensors are opposed to the position magnets, wherein the position sensors are configured to sense magnetic fields of the plurality of position magnets as the position magnets move past the position sensors, and wherein each position sensor is configured to output a proximity signal when it senses the magnetic field of a position magnet; and a position sensing circuit configured to output position signals indicative of the position of the movable member, wherein the position sensing circuit comprises:

a plurality of light emission elements, each of which is coupled to one of the plurality of position sensors, wherein the light emission elements are configured to output photo-signals in response to receiving proximity signals from their associated position sensors, and a plurality of light receiving elements, each of which is associated with a corresponding one of the plurality of light emission elements, wherein the light receiving elements are configured to output position signals when they receive photosignals from their associated light emission elements.

13. The linear motor of claim 12, wherein the light emission elements comprise light emitting diodes.

14. The linear motor of claim 12, wherein the light receiving elements comprise photo-transistors.

15. The linear motor of claim 12, further comprising:

a controller coupled to the position sensing circuit and configured to receive the position signals and to output control signals; and a switching circuit coupled to the controller and configured to receive the control signals and to selectively apply movement signals to the plurality of coils to control movement of the movable member based on the control signals.

16. The linear motor of claim 15, wherein the switching circuit comprises a plurality of triac elements, each of which is coupled to the controller and to one of the plurality of coils, wherein each triac element selectively applies alternating current components to an associated coil in response to the control signals generated by the controller.

17. The linear motor of claim 12, further comprising a shield member mounted on the movable member and interposed between the drive magnets and the position magnets.

18. The linear motor of claim 17, wherein the shield member prevents at least a portion of magnetic fields generated by the drive magnets from affecting the position sensors.

* * * * *